(12) United States Patent
Chen

(10) Patent No.: US 11,511,348 B2
(45) Date of Patent: Nov. 29, 2022

(54) THREE-DIMENSIONAL PRINTING

(71) Applicant: HEWLETT-PACKARD DEVELOPMENT COMPANY, L.P., Spring, TX (US)

(72) Inventor: Tienteh Chen, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/604,328

(22) PCT Filed: Oct. 23, 2018

(86) PCT No.: PCT/US2018/057145
§ 371 (c)(1),
(2) Date: Oct. 10, 2019

(87) PCT Pub. No.: WO2020/018131
PCT Pub. Date: Jan. 23, 2020

(65) Prior Publication Data
US 2021/0354196 A1     Nov. 18, 2021

(51) Int. Cl.
*B22F 1/10* (2022.01)
*B22F 1/103* (2022.01)
(Continued)

(52) U.S. Cl.
CPC .............. *B22F 10/14* (2021.01); *B22F 1/05* (2022.01); *B22F 1/10* (2022.01); *B22F 10/20* (2021.01); *B29C 64/165* (2017.08); *B33Y 70/10* (2020.01); *B22F 1/103* (2022.01); *B33Y 10/00* (2014.12); *B33Y 30/00* (2014.12); *B33Y 40/10* (2020.01); *B33Y 70/00* (2014.12)

(58) Field of Classification Search
CPC .......... B33Y 10/00; B33Y 70/00; B33Y 70/10
See application file for complete search history.

(56) References Cited

U.S. PATENT DOCUMENTS 6,313,257 B1    11/2001   Abbey
2002/0026982 A1    3/2002   Bredt et al.
(Continued)

FOREIGN PATENT DOCUMENTS

CA       3031403 A1    3/2018
CN       100589973 C    2/2010
(Continued)

OTHER PUBLICATIONS

Ambrosi, A et al., 3d-printing Technologies for Electrochemical Applications, 2016, http://pubs.rsc.org/en/Content/Articlelanding/2016/CS/c5cs00714c#!divAbstract.
(Continued)

*Primary Examiner* — Vanessa T. Luk
(74) *Attorney, Agent, or Firm* — Dierker & Kavanaugh PC

(57) ABSTRACT

An example of a multi-fluid kit for three-dimensional printing includes a binder fluid and an adhesion promoter fluid. The binder fluid includes water and polymer particles in an amount ranging from about 1 wt % to about 40 wt % based on the total weight of the binder fluid. The adhesion promoter fluid includes water and an aromatic dihydrazide adhesion promoter in an amount ranging from about 0.1 wt % to about 10 wt % based on a total weight of the adhesion promoter fluid.

7 Claims, 3 Drawing Sheets

(51) Int. Cl.
    *B22F 10/14*    (2021.01)
    *B22F 10/20*    (2021.01)
    *B29C 64/165*    (2017.01)
    *B33Y 70/10*    (2020.01)
    *B22F 1/05*    (2022.01)
    *B33Y 10/00*    (2015.01)
    *B33Y 30/00*    (2015.01)
    *B33Y 70/00*    (2020.01)
    *B33Y 40/10*    (2020.01)

(56) References Cited

U.S. PATENT DOCUMENTS

| | | | |
|---|---|---|---|
| 2007/0241482 A1* | 10/2007 | Giller | B29C 64/165 |
| | | | 264/494 |
| 2009/0029121 A1 | 1/2009 | Hammerman et al. | |
| 2014/0011004 A1 | 1/2014 | Sotzing et al. | |
| 2014/0077486 A1* | 3/2014 | Naruse | C09D 11/326 |
| | | | 347/20 |
| 2015/0166803 A1 | 6/2015 | Jhaveri et al. | |
| 2016/0177122 A1* | 6/2016 | Naruse | C08K 9/10 |
| | | | 523/205 |
| 2016/0200908 A1* | 7/2016 | Osaka | B22F 1/16 |
| | | | 524/556 |
| 2016/0272844 A1 | 9/2016 | Osaka et al. | |
| 2017/0174919 A1 | 6/2017 | Kido et al. | |
| 2017/0209927 A1* | 7/2017 | Yamashita | B29C 64/165 |
| 2017/0297097 A1 | 10/2017 | Gibson et al. | |
| 2017/0306171 A1 | 10/2017 | Vidavsky et al. | |
| 2018/0147777 A1 | 5/2018 | Abbott, Jr. et al. | |
| 2018/0186970 A1 | 7/2018 | Groos et al. | |
| 2018/0236724 A1* | 8/2018 | Compton | H01F 7/021 |
| 2018/0236731 A1 | 8/2018 | Natarajan et al. | |

FOREIGN PATENT DOCUMENTS

| | | |
|---|---|---|
| CN | 102781984 A | 11/2012 |
| CN | 104072665 A | 10/2014 |
| CN | 104725802 A | 6/2015 |
| CN | 105764672 A | 7/2016 |
| EP | 2001656 B1 | 10/2014 |
| JP | 2005-089629 A | 4/2005 |
| JP | 2006-244558 A | 9/2006 |
| JP | 2016-107465 A | 6/2016 |
| WO | 2010120278 | 10/2010 |
| WO | 2015/046629 A1 | 4/2015 |
| WO | 2016/185966 A1 | 11/2016 |
| WO | 2017/060573 A2 | 4/2017 |
| WO | 2018017072 | 1/2018 |

OTHER PUBLICATIONS

Michaels, Production of Metal Parts Using the Three Dimensional Printing Process, Department of Mechanical Engineering, Nov. 29, 1993.

Kessel et al., The diacetone acrylamide crosslinking reaction and its influence on the film formation of an acrylic latex, J. Coat. Technol. Res., 5 (3), 2008, pp. 285-297.

* cited by examiner

THREE-DIMENSIONAL PRINTING

CROSS-REFERENCE TO RELATED APPLICATIONS

This application claims priority to International Patent Application Number PCT/US2018/042850, filed Jul. 19, 2018; the disclosure of which is incorporated by reference herein in its entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
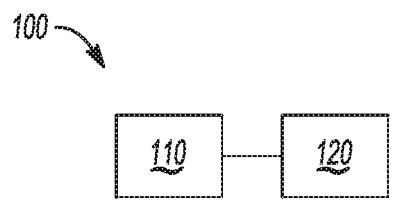
FIGS. 1A and 1B schematically illustrate different example three-dimensional printing kits disclosed herein.

In some examples of three-dimensional (3D) printing, a binder fluid is selectively applied to a layer of build material on a build platform, thereby patterning a selected region of the layer, and then another layer of the build material is applied thereon. The binder fluid is then selectively applied to this other layer, and these processes may be repeated to form a green part (referred to herein as "3D intermediate part") of a 3D part/object that is ultimately to be formed. The binder fluid may be capable of penetrating the layer of the build material onto which it is applied, and/or spreading around an exterior surface of the build material and filling void spaces between particles of the build material. The binder fluid can include binder particles, such as polymer latex particles, that when cured, temporarily hold the build material of the 3D intermediate part together. The 3D intermediate part may be moved from the build platform to a separate device for heating to remove the binder particles and to sinter the build material particles of the patterned intermediate part to form the 3D part/object.

While the binder particles temporarily hold the build material of the 3D intermediate part/object together, the 3D intermediate part may also contain air voids. As such, the patterned intermediate part may be porous, which can reduce its rigidity and increase its fragility. On the build platform, the 3D intermediate part may be supported by adjacent non-patterned build material. However, the fragility of the 3D intermediate part may make it difficult to move the patterned intermediate part form the build platform to the separate device for heating.

In the examples disclosed herein, an aromatic dihydrazide adhesion promoter is included in the binder fluid or is selectively applied with the binder fluid onto the patterned layers. The aromatic dihydrazide has been found to be effective in interacting or otherwise providing adhesion promotion between the polymer particles and the metal particles of the particulate build material. As such, the aromatic dihydrazide adhesion promoter increases the tensile strength of the 3D intermediate part, which enhances its robustness and stability. Enhanced robustness and stability can render the patterned intermediate part strong enough to withstand extraction from the build platform and handling during transfer to the separate heating device. With the aromatic dihydrazide adhesion promoter, lower amounts of polymer particles may be used and lower initial heating (e.g., curing) temperatures may be used without sacrificing the tensile strength of the 3D intermediate part.

As such, as used herein, the term "3D intermediate part" or "3D intermediate object" or "patterned intermediate part/object" refers to an intermediate part that has a shape representative of the final 3D printed part/object, and that includes build material particles that are bound together with polymer particles and the aromatic dihydrazide adhesion promoter. It is to be understood that any build material that is not patterned with the binder fluid or the binder fluid and the separate adhesion promoter is not considered to be part of the 3D intermediate part, even if it is adjacent to or surrounds the 3D intermediate part. For example, unprinted (non-patterned) particulate build material acts to support the 3D intermediate part while contained therein, but the non-patterned particulate build material is not part of the 3D intermediate part unless it is printed with binder fluid or with binder fluid and the separate adhesion promoter fluid.

Also as used herein, "sinter" means to coalesce the build material into a solid or porous mass by heating it. In other words, sintering refers to the joining of the material of adjacent build material particles, and can include complete joining of the build material into a common structure. In some instances, sintering takes place without liquefaction of the build material. It is to be understood, however, that sintering may involve fusing, annealing, melting, etc. depending, in part, upon the build material used.

In accordance with this, the examples disclosed herein include three-dimensional printing kits, multi-fluid kits for three-dimensional printing, and methods for three-dimensional printing.

One example of the three-dimensional printing kit can include: a particulate build material including from about 80 wt % to 100 wt % metal particles based on a total weight of the particulate build material; and a binder fluid including water, polymer particles in an amount ranging from about 1 wt % to about 40 wt % based on a total weight of the binder fluid, and an aromatic dihydrazide adhesion promoter in an amount ranging from about 0.05 wt % to about 5 wt % based on the total weight of the binder fluid.

One example of a multi-fluid kit for three-dimensional printing can include: a binder fluid including water, and polymer particles in an amount ranging from about 1 wt % to about 40 wt % based on the total weight of the binder fluid; and an adhesion promoter fluid including water, and an aromatic dihydrazide adhesion promoter in an amount ranging from about 0.1 wt % to about 10 wt % based on a total weight of the adhesion promoter fluid. This multi-fluid kit may also be included in a three-dimensional printing kit, which also includes a particulate build material including from about 80 wt % to 100 wt % metal particles based on a total weight of the particulate build material.

One example of the method can include: iteratively applying individual build material layers of a particulate build material which includes from about 80 wt % to 100 wt % metal particles based on a total weight of the particulate build material; based on a 3D object model, selectively applying water, polymer particles, and an aromatic dihydrazide adhesion promoter to individual build material layers to define individually patterned layers; and heating all of the individually patterned layers to form a 3D intermediate object.

It is noted that when discussing the three-dimensional printing kits, multi-fluid kits, and methods herein, each of these discussions can be considered applicable to one another whether or not they are explicitly discussed in the context of a particular example. Thus, for example, when discussing a binder fluid related to a three-dimensional printing kit, such disclosure is also relevant to and directly supported in the context of other three-dimensional printing kits, methods of three-dimensional printing, vice versa, etc.

It is also understood that terms used herein will take on their ordinary meaning in the relevant technical field unless specified otherwise. In some instances, there are terms defined more specifically throughout the specification, and thus, these terms have a meaning as described herein.

Particulate Build Materials

In examples of the 3D printing kits and methods disclosed herein, the build material can include any particulate build material that includes from about 80 wt % to 100 wt % metal particles based on the total weight of the particulate build material. In other examples, the metal particles can be present in the particulate build material in amounts ranging from about 90 wt % to 100 wt %, or from about 95 wt % to 100 wt %, or in an amount of 100 wt %. When the metal particles are present in the particulate build material in an amount less than 100 wt %, the remainder of the particulate build material may be made up of additives, such as flow aids (e.g., in amounts ranging from about 0.05 wt % to about 0.2 wt %), polymer powder material, etc.

In some examples, the metal particles are uncoated. By "uncoated", it is meant that the metal particles do not have a polymeric coating formed thereon. The metal particles may, however, have a naturally formed metal oxide layer at its surface. In some examples, the particulate build material is devoid of a polymer resin (i.e., no polymer resin, either as a coating on the metal particles or separate from the metal particles is included).

In an example, the metal particles are a single phase metallic material composed of one element. In this example, the sintering temperature may be below the melting point of the single element. In another example, the metal particles are composed of two or more elements, which may be in the form of a single phase metallic alloy or a multiple phase metallic alloy. In these other examples, sintering generally occurs over a range of temperatures. With respect to alloys, materials with a metal alloyed to a non-metal (such as a metal-metalloid alloy) can be used as well.

In the examples disclosed herein, the particulate build material can include metal particles selected from the group consisting of aluminum, aluminum alloys, titanium, titanium alloys, copper, copper alloys, cobalt, cobalt alloys, chromium, chromium alloys, nickel, nickel alloys, vanadium, vanadium alloys, tin, tin alloys, tungsten, tungsten alloys, tungsten carbide, tantalum, tantalum alloys, molybdenum, molybdenum alloys, magnesium, magnesium alloys, gold, gold alloys, silver, silver alloys, zirconium, zirconium alloys, ferrous alloys, stainless steel, steel, and an admixture thereof. Specific alloy examples can include AlSi 10 Mg, 2xxx series aluminum, 4xxx series aluminum, CoCr MP1, CoCr SP2, Maraging steel MS1, HASTELLOY™ C, HASTELLOY™ X, NickelAlloy HX, INCONEL™ IN625, INCONEL™ IN718, stainless steel GP1, stainless steel 17-4PH, stainless steel 316L, stainless steel 430L titanium 6Al4V, and titanium 6Al-4V ELI7. While several example alloys have been provided, it is to be understood that other alloys may be used.

The temperature(s) at which the metal particles of the particulate build material sinter together is/are above the temperature of the environment in which the patterning portion of the 3D printing method is performed, e.g., patterning at from about 18° C. to about 300° C. In an example, sintering (which may include de-binding and sintering) takes place at a temperature ranging from about 500° C. to about 3,500° C. In some examples, the metal particles may have a melting point ranging from about 500° C. to about 3,500° C. In other examples, the metal particles may be an alloy having a range of melting points.

The particle size of the particulate build material, and in particular of the metal particles, can be similarly sized or differently sized. In one example, the D50 particle size of the particulate build material can range from 0.5 μm to 200 μm. In some examples, the particles can have a D50 particle size distribution value that can range from about 2 μm to about 150 μm, from about 1 μm to about 100 μm, from about 1 μm to about 50 μm, etc. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material).

As used herein, "particle size" refers to the value of the diameter of spherical particles, or, for particles that are not spherical, can refer to the longest dimension of that non-spherical particle. The particle size can be presented as a Gaussian distribution or a Gaussian-like distribution (or normal or normal-like distribution). Gaussian-like distributions are distribution curves that may appear essentially Gaussian in their distribution curve shape, but which can be slightly skewed in one direction or the other (toward the smaller end or toward the larger end of the particle size distribution range). That being stated, an example Gaussian-like distribution of the metal particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of 25 µm means that 50% of the particles (by number) have a particle size greater than 25 µm and 50% of the particles have a particle size less than 25 µm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be essentially referred to as "Gaussian" as used conventionally. In yet other examples, the particles can have a D50 particle size distribution value of from about 2 µm to about 100 µm, from about 5 µm to about 75 µm, from about 25 µm to about 50 µm, from about 5 µm to about 15 µm, or from about 3 µm to about 10 µm. The shape of the particles of the particulate build material can be spherical, non-spherical, random shapes, or a combination thereof.

Aromatic Dihydrazide Adhesion Promoter

To bind the particulate build material on a layer by layer basis and form a patterned intermediate part, an aromatic dihydrazide adhesion promoter can be used. The aromatic dihydrazide adhesion promoter can be present in a binder fluid with polymer particles. Alternatively, the aromatic dihydrazide adhesion promoter can be present in a separate adhesion promoter fluid that is selectively applied with a binder fluid that includes polymer particles.

The aromatic dihydrazide compounds have been found to be effective in interacting with the metal particle surface or otherwise providing adhesion promotion between the polymer particles and metal particles of the particulate build material. Adhesion promotion may be due to a chemical reaction between the aromatic dihydrazide and the polymer particles. Some of the polymer particles disclosed herein include an aromatic portion. In these instances, the adhesion promotion may be due to the aromatic portion of the aromatic dihydrazide strongly interacting with the aromatic portion of the polymer particles via π-π (pi-pi) interaction (i.e., increased van der Walls interaction). Thus, in many instances, the inclusion of an aromatic dihydrazide compound with polymer particles can enhance the tensile strength of a 3D intermediate object/part. This is particularly useful when the 3D intermediate object is to be moved after preparation into an oven for higher temperature heating. Without sufficient tensile strength, the 3D intermediate object can become damaged during the move from the (non-solidified) particulate build material to the oven, particularly if the object is large or complex.

Hydrazides are characterized in organic chemistry as including a nitrogen to nitrogen covalent bond (N—N) with 4 substituents, at least one of which is an acyl group (C═O). In many examples, the other 3 substituents of the hydrazide are hydrogen atoms (H). Dihydrazides include two hydrazide moieties, each of which includes the N—N covalent bond and the acyl group. In the examples disclosed herein, the dihydrazide is also aromatic, and thus the aromatic dihydrazide adhesion promoter has the general formula:

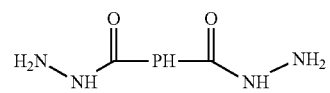

wherein PH is selected from an unsubstituted phenyl group and a substituted phenyl group.

When PH is an unsubstituted phenyl group, the aromatic dihydrazide adhesion promoter is selected from the group consisting of isophthalic dihydrazide; phthalic dihydrazide; and terephthalic dihydrazide. The structures of these aromatic dihydrazides are shown in Table 1.

TABLE 1

| Chemical name | Chemical Structure |
|---|---|
| Isophthalic Dihydrazide | |
| Phthalic Dihydrazide | |
| Terephthalic dihydrazide | |

When PH is a substituted phenyl group, examples of groups that may be substituted on the phenyl group include a halide functional group (e.g., Cl, Br, etc.), a hydroxide functional group (—OH), an amine functional group (—NH$_2$), a nitro functional group (—NO$_2$), and a sulfo functional group (—SO$_3$H). In an example when PH is a substituted phenyl group, the aromatic dihydrazide adhesion promoter is selected from the group consisting of 3-choloro-isophthalic dihydrazide; 3-choloro-phthalic dihydrazide; 2-choloro-terephthalic dihydrazide; 3-bromo-isophthalic dihydrazide; 3-bromo-phthalic dihydrazide; 2-bromo-terephthalic dihydrazide; 3-hydroxy-isophthalic dihydrazide; 3-(2-hydroxyethyl)-isophthalic dihydrazide; 3-sulfo-isophthalic dihydrazide; 3-nitro-isophthalic dihydrazide; 3-nitro-phthalic dihydrazide; 2-nitro-terephthalic dihydrazide;

3-amino-isophthalic dihydrazide; 2-amino-terephthalic dihydrazide; and 3-amino-phthalic dihydrazide. The structures of these aromatic dihydrazides are shown in Table 2.

TABLE 2

| Chemical name | Chemical Structure |
|---|---|
| 3-choloro-isophthalic dihydrazide | (structure) |
| 3-choloro-phthalic dihydrazide | (structure) |
| 2-choloro-terephtahlic dihydrazide | (structure) |
| 3-bromo-isophtahlic dihydrazide | (structure) |
| 3-bromo-phthalic dihydrazide | (structure) |
| 2-bromo-terephtahlic dihydrazide | (structure) |
| 3-hydroxy-isophtahlic dihydrazide | (structure) |

TABLE 2-continued

| Chemical name | Chemical Structure |
|---|---|
| 3-(2-hydroxyethyl)-isophthalic dihydrazide | (structure) |
| 3-sulfo-isophtahlic dihydrazide | (structure) |
| 3-nitro-isophtahlic dihydrazide | (structure) |
| 3-nitro-phthalic dihydrazide | (structure) |
| 2-nitro-terephthalic dihydrazide | (structure) |
| 3-amino-isophthalic dihydrazide | (structure) |
| 2-amino-terephthalic dihydrazide | (structure) |

TABLE 2-continued

| Chemical name | Chemical Structure |
|---|---|
| 3-amino-phthalic dihydrazide | H₂N-NH-C(=O)-[benzene ring with NH₂]-C(=O)-NH-NH₂ |

In the examples disclosed herein, any of the examples of the aromatic dihydrazides may be used alone or in combination.

Polymer (Latex) Particles

As mentioned above, to bind the particulate build material on a layer by layer basis and form a 3D intermediate part, a binder fluid with polymer particles can be used. The following discussion relates particularly to the polymer particles that can be used in the binder fluid. In some examples, the polymer particles are latex particles. Latex particles refer to any polymer (homopolymer, co-polymer, or heteropolymer) that is capable of being dispersed in an aqueous medium.

The polymer (latex) particles may have several different morphologies. In one example, the polymer particles can include two different copolymer compositions, which may be fully separated core-shell polymers, partially occluded mixtures, or intimately comingled as a polymer solution. In another example, the polymer particles can be individual spherical particles containing polymer compositions of hydrophilic (hard) component(s) and/or hydrophobic (soft) component(s) that can be interdispersed. In one example, the interdispersion can be according to IPN (interpenetrating networks) although it is contemplated that the hydrophilic and hydrophobic components may be interdispersed in other ways. In yet another example, the polymer particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the polymer particles can include 2, 3, or 4 or more relatively large polymer particles that can be attached to one another or can surround a smaller polymer core. In a further example, the polymer particles can have a single phase morphology that can be partially occluded, can be multiple-lobed, or can include any combination of any of the morphologies disclosed herein.

In some examples, the polymer particles can be homopolymers. In other examples, the polymer particles can be heteropolymers or copolymers. In an example, a heteropolymer can include a hydrophobic component and a hydrophilic component. In this example, the heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

Examples of monomers that may be used to form the hydrophobic component of the heteropolymer polymer (latex) particles include C4 to C8 alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific example monomers can include, C1 to C20 linear or branched alkyl (meth)acrylate, alicyclic (meth)acrylate, alkyl acrylate, styrene, methyl styrene, polyol (meth)acrylate, hydroxyethyl (meth)acrylate, or a combination thereof. In one specific class of examples, the polymer (latex) particles can be a styrene (meth)acrylate copolymer. In still another example, the polymer (latex) particles can include a copolymer with copolymerized methyl methacrylate being present at about 50 wt % or greater, or copolymerized styrene being present at about 50 wt % or greater. Both can be present, with one or the other at about 50 wt % or greater in a more specific example.

The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable fluid, such as a binder fluid, can impact the nature of the moiety as well (acid form vs. salt or ester form). Thus, a monomer or a moiety of a polymer described as (meth)acrylic acid or as (meth)acrylate should not be read so rigidly as to not consider relative pH levels, ester chemistry, and other general organic chemistry concepts.

In still other examples, the polymer (latex) particles in the binder fluid include polymerized monomers of vinyl chloride, vinylidene chloride, vinylbenzyl chloride, vinyl ester, styrene, ethylene, maleate esters, fumarate esters, itaconate esters, α-methyl styrene, p-methyl styrene, methyl methacrylate, hexyl acrylate, hexyl methacrylate, hydroxyethyl acrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, 2-phenoxyethyl methacrylate, isobornyl acrylate, tetrahydrofurfuryl acrylate, benzyl methacrylate, benzyl acrylate, ethoxylated nonyl phenol methacrylate, isobornyl methacrylate, ethylene glycol dimethacrylate, diethylene glycol dimethacrylate, triethylene glycol dimethacrylate, cyclohexyl methacrylate, trimethyl cyclohexyl methacrylate, t-butyl methacrylate, n-octyl methacrylate, lauryl acrylate, lauryl methacrylate, trydecyl methacrylate, alkoxylated tetrahydrofurfuryl acrylate, isodecyl acrylate, dimethyl maleate, dioctyl maleate, acetoacetoxyethyl methacrylate, diacetone acrylamide, N-vinyl imidazole, N-vinylcarbazole, N-Vinylcaprolactam, pentaerythritol tri-acrylate, pentaerythritol tetra-acrylate, pentaerythritol tri-methacrylate, pentaerythritol tetra-methacrylate, glycidol acrylate, glycidol methacrylate, tetrahydrofuryl acrylate, tetrahydrofuryl methacrylate, diacetone acrylamide, t-butyl acrylamide, divinylbenzene, 1,3-butadiene, acrylonitrile, methacrylonitrile, combinations thereof, derivatives thereof, or mixtures thereof. These monomers include low glass transition temperature (Tg) monomers that can be used to form the hydrophobic component of a heteropolymer.

In some examples, a composition of the polymer (latex) particles can include acidic monomer(s). In some examples, the acidic monomer content can range from 0.1 wt % to 5 wt %, from 0.5 wt % to 4 wt %, or from 1 wt % to 2.5 wt % of the polymer particles with the remainder of the polymer particle being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized to form a polymer, heteropolymer, or copolymer with a co-polymerizable dispersing agent. The co-polymerizable dispersing agent can be a polyoxyethylene compound, such as a HITENOL® compound (Montello Inc.) e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

Any suitable polymerization process can be used to form the polymer particles. In some examples, an aqueous dispersion of latex particles can be produced by emulsion polymerization or co-polymerization of any of the above monomers.

In one example, the polymer (latex) particles can be prepared by polymerizing high Tg hydrophilic monomers to form the high Tg hydrophilic component and attaching the high Tg hydrophilic component onto the surface of the low Tg hydrophobic component. In another example, the polymer (latex) particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the polymer (latex) particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the polymer (latex) particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In some examples, the polymer (latex) polymer can have a weight average molecular weight (Mw, g/mol) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the polymer (latex0 particles can be latent and can be activated by heat (which may be applied iteratively during 3D intermediate part formation or after 3D intermediate part formation). In these instances, the activation temperature can correspond to the minimum film formation temperature (MFFT) or a glass transition temperature ($T_g$) which can be greater than ambient temperature. As mentioned herein, "ambient temperature" may refer to room temperature (e.g., ranging about 18° C. to about 22° C.). In one example, the polymer (latex) particles can have a MFFT or $T_g$ that can be at least about 15° C. greater than ambient temperature. In another example, the MFFT or the $T_g$ of the bulk material (e.g., the more hydrophobic portion) of the polymer (latex) particles can range from about 25° C. to about 200° C. In another example, the polymer (latex) particles can have a MFFT or $T_g$ ranging from about 40° C. to about 120° C. In yet another example, the polymer (latex) particles can have a MFFT or $T_g$ ranging from about 0° C. to about 150° C. In a further example, the polymer latex particles can have a $T_g$ that can range from about −20° C. to about 130° C., or in another example from about 60° C. to about 105° C. At a temperature above the MFFT or the $T_g$ of a latent latex polymer particle, the polymer particles can coalesce and can bind materials, such as the metal particles in the particulate build material.

The polymer (latex) particles can have a particle size that can be jetted via thermal ejection or printing, piezoelectric ejection or printing, drop-on-demand ejection or printing, continuous ejection or printing, etc. In an example, the particle size of the polymer (latex) particles can range from about 1 nm to about 400 nm. In yet other examples, a particle size of the polymer particles can range from about 10 nm to about 300 nm, from about 50 nm to about 250 nm, from about 100 nm to about 250 nm, or from about 25 nm to about 250 nm. In some examples, the polymer particles can have a particle size that can be jetted via thermal ejection or printing, piezoelectric ejection or printing, drop-on-demand ejection or printing, continuous ejection or printing, etc. In these examples, the particle size of the polymer particles be about 100 nm or more.

In some examples, the polymer (latex) particles have a glass transition temperature higher than 60° C. and an average particle size of 1 nm or more.

Binder Fluids and Adhesion Promoter Fluids

As mentioned herein, to bind the particulate build material together during the build process to form a 3D intermediate part, a binder fluid can be applied to the particulate build material on a layer by layer basis.

In some examples, the binder fluid can include the aromatic dihydrazide adhesion promoter as well as polymer particles. If the binder fluid includes the aromatic dihydrazide adhesion promoter and the polymer particles, then there may or may not be a separate adhesion promoter fluid. If the aromatic dihydrazide adhesion promoter is not present in the binder fluid, then examples of the 3D printing kit and/or multi-fluid kit disclosed herein include a separate adhesion promoter fluid that contains the aromatic dihydrazide adhesion promoter. In other words, the aromatic dihydrazide adhesion promoter and the polymer particles are included in the examples disclosed herein i) either together in a common binder fluid, or ii) in separate fluids as a binder fluid and an adhesion promoter fluid, or iii) the aromatic dihydrazide adhesion promoter can be included with the polymer particles in the common binder fluid and there may still further be a separate adhesion promoter fluid.

As such, as used herein, the term "binder fluid" refers to a fluid that includes water and polymer particles that are effective for binding layers of particulate build material when forming a 3D intermediate part. Examples of the binder fluid can also include the aromatic dihydrazide adhesion promoter, particularly if there is not a separate adhesion promoter fluid present. Moreover, the term "adhesion promoter fluid" refers to a fluid that includes water and the aromatic dihydrazide adhesion promoter. The adhesion promoter fluid may or may not be present in a 3D printing kit or related methods of 3D printing, as the aromatic dihydrazide adhesion promoter may already be present in the binder fluid. Still further, the term "fluid" does not infer that the composition is free of particulate solids, but rather, can include solids dispersed therein, including carbon black pigment or disperse dyes, latex particles, or other dispersed solids. Although, in some examples, the binder fluid is devoid of any colorant (pigment or dye).

Each of the fluids disclosed herein can be aqueous fluids in the form of aqueous dispersions or solutions carried by an aqueous liquid vehicle. As used herein, the term "aqueous liquid vehicle" may refer to i) the liquid fluid to which the polymer particles and aromatic dihydrazide adhesion promoter are added to form one example of the binder fluid, ii) the liquid vehicle to which the polymer particles are added to form another example of the binder fluid, or iii) the liquid fluid to which the aromatic dihydrazide adhesion promoter is added to form an example of the separate adhesion promoter fluid. The aqueous liquid vehicle can make up about 60 wt % to about 90 wt % of the example binder fluids. In other examples, the aqueous liquid vehicle can be included in the example binder fluids at from about 60 wt % to about 85 wt %, from about 60 wt % to about 80 wt %, from about 75 wt % to about 90 wt %, or from about 70 wt % to about 80 wt %, based on a total weight of the binder fluid. If there is a separate adhesion promoter fluid, the aqueous liquid vehicle of this fluid can make up about 80 wt % to about 99.9 wt % of the adhesion promoter fluid. In further detail, if there is a separate adhesion promoter fluid, the aqueous liquid vehicle can be included in this fluid at from about 80 wt % to about 99 wt %, from about 80 wt % to about 95 wt %, from about 90 wt % to about 98 wt %, or from about 85 wt % to about 95 wt %, based on a total weight of the adhesion promoter fluid.

In examples of the binder fluid, the polymer particles can be present, based on a total weight of the binder fluid, in an amount ranging from about 1 wt % to about 40 wt %. In other more detailed examples, the polymer particles can be present in an amount ranging from about 5 wt % to about 30 wt %, from about 12 wt % to about 22 wt %, from about 15 wt % to about 20 wt %, from about 10 wt % to about 20 wt %, or from about 6 wt % to about 18 wt %, based on the total weight of the binder fluid. These weight percentages represent active polymer particle amounts, and do not account for any water or other non-active components that may be part of a polymer particle solution or dispersion that is added to the binder fluid.

Some examples of the binder fluid also include the aromatic dihydrazide adhesion promoter. In these examples, the aromatic dihydrazide adhesion promoter can be present, based on a total weight of the binder fluid, in an amount ranging from about 0.05 wt % to about 5 wt %. In other more detailed examples, the aromatic dihydrazide adhesion promoter can be present in an amount ranging from about 0.1 wt % to about 2.5 wt %, from about 0.3 wt % to about 3 wt %, or from about 0.6 wt % to about 1.5 wt %, based on the total weight of the binder fluid. These weight percentages represent active aromatic dihydrazide amounts, and do not account for any water or other non-active components that may be part of an aromatic dihydrazide solution or dispersion that is added to the binder fluid.

In examples of the adhesion promoter fluid (that is separate from the binder fluid), the aromatic dihydrazide adhesion promoter can be present, based on a total weight of the adhesion promoter fluid, in an amount ranging from about 0.1 wt % to about 10 wt %. In other more detailed examples, the aromatic dihydrazide adhesion promoter can be present at from about 0.3 wt % to about 4.5 wt %, from about 1 wt % to about 3 wt %, or from about 0.9 wt % to about 2 wt %, based on the total weight of the adhesion promoter fluid. These weight percentages represent active aromatic dihydrazide amounts, and do not account for any water or other non-active components that may be part of an aromatic dihydrazide solution or dispersion that is added to the adhesion promoter fluid.

When both the polymer particles and the aromatic dihydrazide adhesion promoter are used and regardless of whether the binder fluid delivers both the polymer particles and the aromatic dihydrazide adhesion promoter to the particulate build material, or whether the binder fluid delivers the polymer particles and a separate adhesion promoter fluid delivers the aromatic dihydrazide adhesion promoter, there are weight ratios of polymer particles to aromatic dihydrazide adhesion promoter within a layer of the particulate build material that can be effective for enhancing tensile strength of the 3D intermediate object prior to sintering. For example, the weight ratio of polymer particles to aromatic dihydrazide adhesion promoter when applied to the particulate build material can be from about 10:1 to about 100:1, from about 15:1 to about 80:1, or from about 20:1 to about 70:1. If there are two fluids used, namely a binder fluid and an adhesion promoter fluid, these fluids can be formulated to deliver the polymer particles from the binder fluid and the aromatic dihydrazide adhesion promoter from the adhesion promoter fluid at a binder fluid to adhesion promoter weight ratio of about 5:1 to about 1:5, from about 2:1 to about 1:2, or at about 1:1. The respective fluids can be formulated to deliver volumes of fluid sufficient so that some mixing can occur when applied to the particulate build material.

The aqueous liquid vehicle of the example binder fluids and/or the separate adhesion promoter fluid can include water, co-solvent(s), surfactant(s) and/or dispersing agent(s), antimicrobial(s), viscosity modifier(s), pH adjuster(s), sequestering agent(s), and the like. In one example, water can be present at from about 30 wt % to 100 wt % of the aqueous vehicle component—excluding aromatic dihydrazide and/or polymer particles—based on a total weight of the aqueous liquid vehicle. In other examples, the water can be present at from about 60 wt % to about 95 wt %, from about 75 wt % to 100 wt %, or from about 80 wt % to about 99 wt %, based on a total weight of the aqueous liquid vehicle.

The co-solvent can be present at from about 0.5 wt % to about 50 wt % in the aqueous liquid vehicle, based on a total weight of the binder fluid or the total weight of the adhesion promoter fluid. In some examples, the co-solvent can be a high boiling point solvent, which can have a boiling point of at least about 110° C. Example co-solvents can include aliphatic alcohols, aromatic alcohols, alkyl diols, glycol ethers, polyglycol ethers, lactams, caprolactams, formamides, acetamides, long chain alcohols, and combinations thereof. For example, the co-solvent can include aliphatic alcohols with a —$CH_2OH$ group, secondary aliphatic alcohols, 1,2-alcohols, 1,3-alcohols, 1,5-alcohols, ethylene glycol alkyl ethers, propylene glycol alkyl ethers, C6 to C12 homologs of polyethylene glycol alkyl ethers, N-alkyl caprolactams, unsubstituted caprolactams, both substituted and unsubstituted formamides, both substituted and unsubstituted acetamides, combinations thereof, and the like. Other example organic co-solvents can include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidone, 2-methyl-1,3-propanediol (MP-diol), and combinations thereof.

If a surfactant is included, examples can include SURFYNOL® SEF (a self-emulsifiable wetting agent based on acetylenic diol chemistry), SURFYNOL® 104 (a non-ionic wetting agent based on acetylenic diol chemistry), or SURFYNOL® 440 (an ethoxylated low-foam wetting agent) (all available from Evonik Industries AG, Germany); TERGITOL® TMN-6 (a branched secondary alcohol ethoxylate, non-ionic surfactant), TERGITOL® 15-S-5 or TERGITOL® 15-S-7 (each of which is a secondary alcohol ethoxylate, non-ionic surfactant), or DOWFAX® 2A1 or DOWFAX® 8390 (each of which is an alkyldiphenyloxide disulfonate, available from Dow, USA); CAPSTONE® FS-35 (non-ionic fluorosurfactant from DuPont, USA) or a combination thereof. The surfactant or combinations of surfactants can be present in the binder fluid and/or the adhesion promoter fluid at from about 0.1 wt % to about 5 wt % in its respective fluid based on the total fluid content weight, and in some examples, can be present at from about 0.5 wt % to about 2 wt %. These weight percentages represent active surfactant amounts, and do not account for any water or other non-active components that may be part of a surfactant solution or dispersion that is added to the binder fluid and/or adhesion promoter fluid.

With respect to antimicrobials, any compound suitable to inhibit the growth of harmful microorganisms can be included. These additives may be biocides, fungicides, and other microbial agents. Examples of suitable antimicrobials can include NUOSEPT® (Troy, Corp.), UCARCIDE™, KORDEK™, ROCIMA™, KATHON™ (all available from The Dow Chemical Co.), VANCIDE® (R.T. Vanderbilt Co.), PROXEL® (Arch Chemicals), ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol (Thor Chemicals); AXIDE™ (Planet Chemical); NIPACIDE™ (Clariant), etc. In an example, the example binder fluids and/or the separate adhesion promoter fluid may include a total amount of antimicrobials that ranges from about 0.0001 wt % to about 1 wt %. These weight percentages represent active antimicrobial amounts, and do not account for any water or other non-active components that may be part of an antimicrobial solution or dispersion that is added to the binder fluids and/or the separate adhesion promoter fluid.

Sequestering agents such as EDTA (ethylene diamine tetra acetic acid) may be included to eliminate the deleterious effects of heavy metal impurities, and buffer solutions may be used to control the pH of the binder fluid and/or the adhesion promoter fluid. Whether a single chelating agent is used or a combination of chelating agents is used, the total amount of chelating agent(s) in the example binder fluids and/or the separate adhesion promoter fluid may range from greater than 0 wt % to about 2 wt % based on the total weight of the binder fluid and/or the separate adhesion promoter fluid. These weight percentages represent active sequestering/chelating agent amounts, and do not account for any water or other non-active components that may be part of a sequestering agent solution or dispersion that is added to the example binder fluids and/or the separate adhesion promoter fluid.

Viscosity modifiers and buffers may also be present, as well as other additives to modify properties of the respective fluids.

In some examples, the aqueous liquid vehicle(s) can also include from about 0.1 wt % to about 1 wt % of an anti-kogation agent, based on a total weight of the binder fluid or the total weight of the adhesion promoter fluid. Kogation refers to the deposit of dried solids on a printhead. An anti-kogation agent can be included to prevent the buildup of dried solids on the printhead. Examples of suitable anti-kogation agents can include oleth-3-phosphate (commercially available as CRODAFOS™ O3A or CRODAFOS™ N-3 acid), dextran 500 k, CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

Three-Dimensional Printing Kits, Multi-Fluid Kits for Three-Dimensional Printing, and Methods of Three-Dimensional Printing As used herein, a "material set" or "kit" can be synonymous with and understood to include a plurality of compositions comprising one or more components where the different compositions can be separately contained in one or more containers prior to and/or during use, e.g., building a green 3D object for subsequent fusing. These compositions of the "kit" can be combined together during a 3D build process. The containers can be any type of a vessel, box, or receptacle made of any material Referring now to FIG. 1A, a 3D printing kit 100 is schematically shown and can include a particulate build material 110 including from about 80 wt % to 100 wt % metal particles based on the total weight of the particulate build material; and a binder fluid 120 including water, polymer particles in an amount ranging from about 1 wt % to about 40 wt % based on a total weight of the binder fluid, and an aromatic dihydrazide adhesion promoter in an amount ranging from about 0.05 wt % to about 5 wt % based on the total weight of the binder fluid.

Figure 1B:
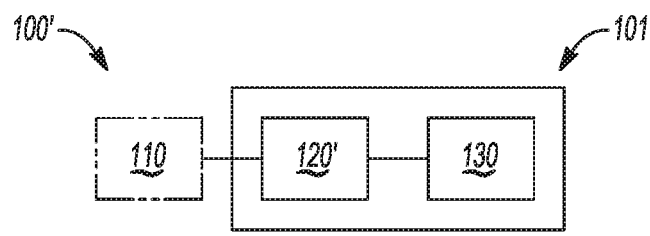

Referring now to FIG. 1B, a multi-fluid kit 101 for 3D printing is schematically shown and can include a binder fluid 120' including water, and polymer particles in an amount ranging from about 1 wt % to about 40 wt % based on a total weight of the binder fluid, and an adhesion promoter fluid 130 including water, and an aromatic dihydrazide adhesion promoter in an amount ranging from about 0.1 wt % to about 10 wt % based on a total weight of the adhesion promoter fluid. In this example, the multi-fluid kit 101 may be included in a 3D printing kit 100', which further includes a particulate build material 110 including from about 80 wt % to 100 wt % metal particles based on the total weight of the particulate build material 110.

Thus, the 3D printing kits 100, 100' include the particulate build material 110, and one or two fluids 120 or 120' and 130 to deliver polymer particles and the aromatic dihydrazide adhesion promoter to the particulate build material 110. In examples where there is a separate adhesion promoter fluid 130, the aromatic dihydrazide adhesion promoter can be in both fluids 120, 130 or simply in the adhesion promoter fluid 130 (and thus not in the binder fluid 120').

Figure 2:
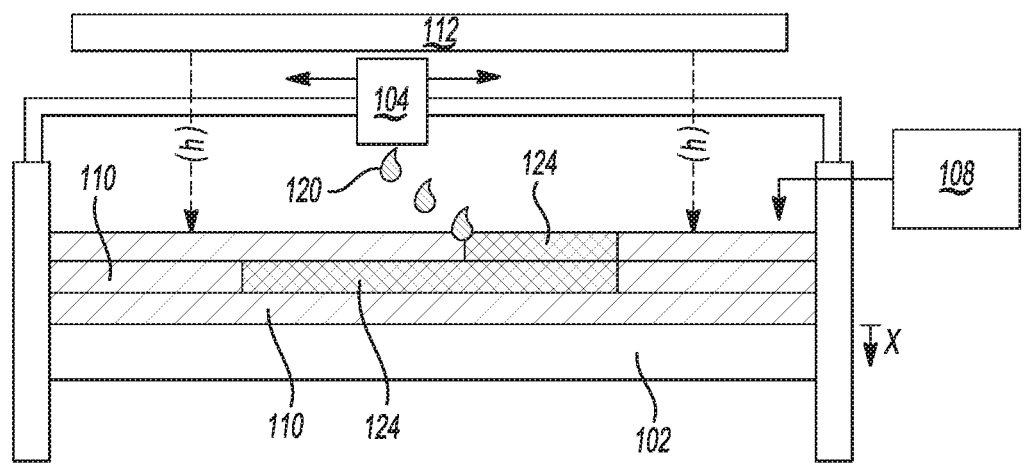
FIG. 2 graphically illustrates an example three-dimensional printing kit in use in accordance with an example three-dimensional printing method disclosed herein.

FIG. 2 illustrates an example of the 3D printing kit 100 in use. In this example, the particulate build material 110 is deposited from a particulate build material source 108 onto a build platform 102 where it can be flattened or smoothed, such as by a mechanical roller or other flattening mechanism or technique. In this example, the binder fluid 120 includes the polymer particles and the aromatic dihydrazide adhesion promoter. The binder fluid 120 can be ejected onto the particulate build material 110 from a fluid ejector 104 (such as a thermal inkjet printhead or a piezoelectric inkjet printhead), for example, to provide for selective patterning of the particulate build material 110. The location(s) of the selective applied binder fluid 120 can be selected to correspond with a layer of a 3D printed object, such as from a 3D object model or computer model. The patterned portion(s) of the layer of the particulate build material 110 are shown at reference numeral 124.

Heat (h) can be used, such as from a heat source 112, at the various layers (or group of layers) to remove water from the binder fluid 120 throughout the patterning process. This temperature is 100° C. or less. In one example, heat can be applied from overhead, e.g., prior to application of the next layer of particulate build material, or after multiple layers are patterned, etc.), and/or can be provided by the build platform 102 from beneath the particulate build material 110 and/or from the particulate build material source 108 (which preheats the particulate build material 110 prior to dispensing it on the build platform 102 or a previously applied and patterned layer.

After individual layers are patterned with binder fluid 120, the build platform 102 can be dropped a distance of (x), which can correspond to at least the thickness of a patterned layer in one example, so that another layer of the particulate build material 110 can be added thereon and patterned with the binder fluid 120, etc. The process can be repeated on a layer by layer basis until all of the desired layers are patterned in accordance with a 3D object model.

After all of the desired layers of particulate build material 110 are patterned with the binder fluid 120, heating all of the individually patterned layers is performed. This heating is performed at a temperature ranging from about 120° C. to about 200° C. At this temperature range, heating coalesces the (latex) polymer particles to form a strong polymer film. Without being bound to any theory, it is believed that heating may also improve the interaction between the aromatic dihydrazide and the metal particle surface. The improvement may be due to chemical reaction between the aromatic dihydrazide and the (latex) polymer particles, and/or to the increase of the van der Waals interaction between the aromatic dihydrazides and the aromatic part of the (latex) polymer particles. As such, heating all of the individually patterned layers forms a polymeric network among the metal particles in the patterned portions 124 of all of the individually patterned layers, thereby forming a 3D intermediate object. The now cured portions form the 3D intermediate object, and any non-patterned build material surrounding the 3D intermediate object remains non-cured.

The 3D intermediate part, in this example, includes a 3D object formed of cured/solidified 3D intermediate part layers, which include both particulate build material and a network of polymeric particles and adhesion promoter holding the particulate build material together. The 3D intermediate part that is formed is stable enough to be moved to an oven (or other heating device) suitable for de-binding and sintering e.g., annealing, melting, fusing, or the like.

Figure 3:
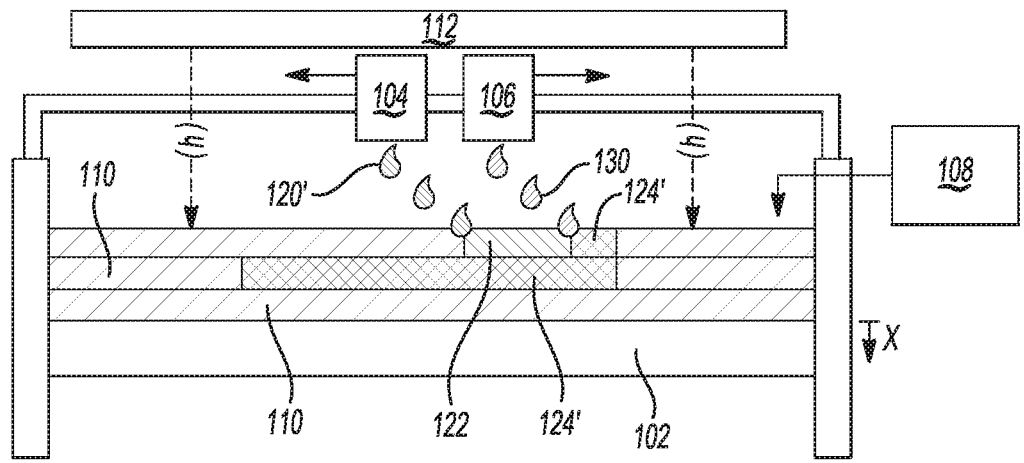
FIG. 3 graphically illustrates another example three-dimensional printing kit in use in accordance with another example three-dimensional printing method disclosed herein.

FIG. 3 illustrates another example of the 3D printing kit 100' in use. As described in reference to FIG. 2, the particulate build material 110 is deposited from a particulate build material source 108 onto a build platform 102 where it can be flattened or smoothed. In this example, the binder fluid 120' includes the polymer particles, but the aromatic dihydrazide adhesion promoter is delivered from a separate adhesion promoter fluid 130. The separate fluids 120',130 can be separately ejected onto the particulate build material 110 from respective fluid ejectors 104, 106. To provide for selective patterning of the particulate build material 110, the location of the binder fluid 120' and adhesion promoter fluid 130 can correspond with a layer of a 3D printed object, such as from a 3D object model or computer model.

The patterned portions are shown at 124' in FIG. 3. Also shown in this FIG. 3 is an intermediate layer 122 which includes the particulate build material 110 and the binder fluid 120', as the adhesion promoter fluid 130 (in this example) has not yet come into contact with this intermediate layer 122. It should be noted that when there are two separate fluids 120',130, one which carries polymer particles and another that carries the aromatic dihydrazide adhesion promoter, the aromatic dihydrazide adhesion promoter does not necessarily need to be applied to every place that the binder fluid 120' is applied. For example, it may be the case that the adhesion promoter fluid 130 could be reserved for areas where additional binding strength may be desired, and not used at other locations where the binder fluid 120' is sufficient to provide the binding strength. Small detailed portions of a 3D intermediate part may benefit from additional adhesion or tensile strength; whereas, in the center or core of 3D intermediate part, the polymer particles may be sufficient to provide binding without the use of the aromatic dihydrazide adhesion promoter. Thus, the use of two separate fluids 120',130 provides some additional flexibility with respect to modulating binding strength or tensile strength for use on an as desired basis.

As shown in FIG. 3, heat (h) can be used, such as from a heat source 112, at the various layers (or group of layers) to remove water from the binder fluid 120' and from the adhesion promoter fluid 130 throughout the patterning process. This temperature is 100° C. or less. In one example, heat can be applied from overhead, e.g., prior to application of the next layer of particulate build material, or after multiple layers are patterned, etc.), and/or can be provided by the build platform 102 from beneath the particulate build material 110 and/or from the particulate build material source 108 (which preheats the particulate build material 110 prior to dispensing it on the build platform 102 or a previously applied and patterned layer.

After individual layers are patterned with binder fluid 120' and the adhesion promoter fluid 130, the build platform 102 can be dropped a distance of (x), which can correspond to at least the thickness of a patterned layer in one example, so that another layer of the particulate build material 110 can be added thereon and patterned with the binder fluid 120' and the adhesion promoter fluid 130, etc. The process can be repeated on a layer by layer basis until all of the desired layers are patterned in accordance with a 3D object model.

After all of the desired layers of particulate build material 110 are patterned with the binder fluid 120' and the adhesion promoter fluid 130, heating all of the individually patterned layers is performed. This heating is performed at a temperature ranging from about 120° C. to about 200° C. At this temperature range, heating coalesces the (latex) polymer particles to form a strong polymer film. Without being bound to any theory, it is believed that heating may also improve the interaction between the aromatic dihydrazide and the metal particle surface. The improvement may be due to chemical reaction between the aromatic dihydrazide and the (latex) polymer particles, and/or to the increase of the van der Waals interaction between the aromatic dihydrazides and the aromatic part of the (latex) polymer particles. As such, heating all of the individually patterned layers forms a polymeric network among the metal particles in the patterned portions 124 of all of the individually patterned layers, thereby forming a 3D intermediate object. The now cured portions form the 3D intermediate object, and any non-patterned build material surrounding the 3D intermediate object remains non-cured.

The 3D intermediate part, in this example, includes a 3D object formed of cured/solidified 3D intermediate part layers, which include both particulate build material and a network of polymeric particles and adhesion promoter holding the particulate build material together. The 3D intermediate part that is formed is stable enough to be moved to an oven (or other heating device) suitable for de-binding and sintering e.g., annealing, melting, fusing, or the like.

The ejector(s) 104 or 104, 106 can deposit fluid(s) 120 or 120' and 130 in a layer that corresponds to the layers of the 3D object, and can be used to form a 3D intermediate part in any orientation. For example, the 3D intermediate part can be printed from bottom to top, top to bottom, on its side, at an angle, or any other orientation. The orientation of the 3D intermediate part can also be formed in any orientation relative to the layering of the particulate build material 110. For example, the 3D intermediate part can be formed in an inverted orientation or on its side relative to the build layering within the particulate build material 110. The orientation of build or the orientation of the 3D intermediate part within the particulate build material 110 can be selected in advance or even by the user at the time of printing, for example.

Figure 4:
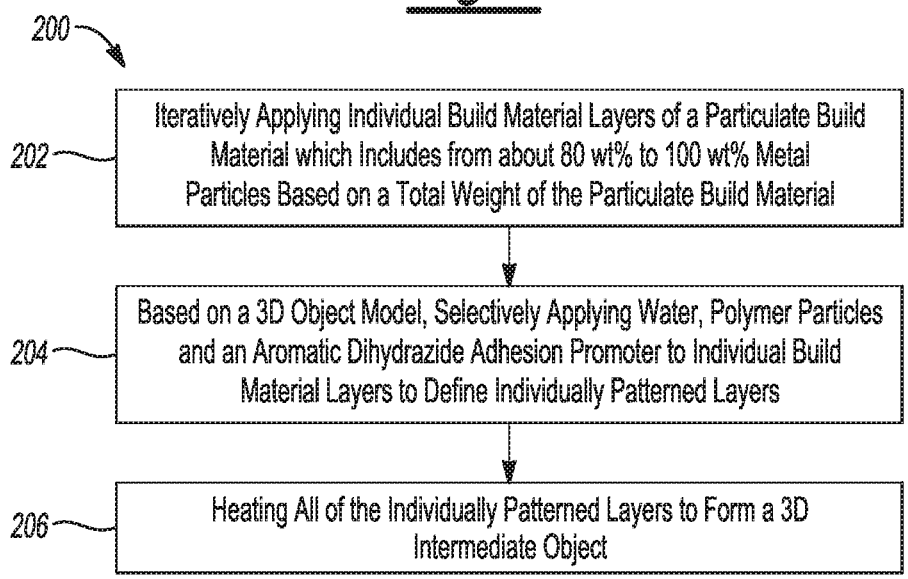
FIG. 4 is a flow diagram illustrating an example method of three-dimensional printing in accordance with the present disclosure.

In another example, as shown in FIG. 4, a method 200 of three-dimensional printing can include iteratively applying individual build material layers of a particulate build material which includes from about 80 wt % to 100 wt % metal particles based on a total weight of the particulate build material (reference numeral 202); based on a 3D object model, selectively applying water, polymer particles, and an aromatic dihydrazide adhesion promoter to individual build material layers to define individually patterned layers (reference numeral 204); and heating all of the individually patterned layers to form a 3D intermediate object (reference numeral 206).

The selective application of the water, polymer particles, and aromatic dihydrazide adhesion promoter can be carried out using a single binder fluid or can be carried out using multiple fluids, with water and the polymer particles in the binder fluid and water and the aromatic dihydrazide adhesion promoter in a separate adhesion promoter fluid.

Following application of the single binder fluid or the binder fluid and the separate adhesion promotor fluid, the particulate build material and fluid(s) applied thereto can be heated to an elevated temperature. Heating cures the polymer particles and the aromatic dihydrazide to form a network (which may include 7-7 interaction). This network solidifies the 3D intermediate part in preparation for moving to a sintering oven. In one example, heating to cure can be carried out at from about 120° C. to about 200° C. or from about 140° C. to about 180° C. for time sufficient to solidify or stabilize the 3D intermediate part for movement to a sintering oven. This heating temperature may be lower, for example, than heating temperatures used to cure the polymer particles in the absence of the aromatic dihydrazide adhesion promoter, or to cure the polymer particles in the presence of a comparative adhesion promoter, such as an alkyl dihydrazide (e.g., adipic dihydrazide). Lower curing temperatures help to minimize the migration of surfactants and other chemicals from the patterned build material to the non-patterned build material. As such, the ability to de-cake the 3D intermediate part from the non-patterned build material is improved. Reducing migration of the binder fluid and/or separate adhesion promoter fluid chemicals into the non-patterned build material also improves the recyclability of the non-patterned build material.

Heating may occur after patterning of all of the layers, and thus the time frames can vary depending on size of the 3D intermediate part. For example, large objects with a smaller surface to volume ratio may take longer to drive off enough fluid to stabilize the 3D intermediate part, than a smaller object with a larger surface to volume ratio. That stated, time frames for heating the patterned layers can be from about 10 minutes to about 8 hours, or from about 30 minutes to about 3 hours. In many cases, individual layers can be heated at temperatures at or below 100° C. during the build, and additional, high temperature heating (120° C. to about 200° C.) can occur after patterning, in order to form the 3D intermediate part.

Upon coalescing or otherwise binding of the particulate build material by the polymer particles in combination with the aromatic dihydrazide adhesion promoter, the 3D intermediate part with enhanced tensile strength can be moved to a heating device, such as a sintering oven. In one example, the heating can be a temperature ranging from about 500° C. to about 3,500° C. At lower temperatures within the range, the network of the polymer particles and the aromatic dihydrazide adhesion promoter can thermally degrade, thereby debinding the 3D intermediate part, and at the higher temperatures within the range, the metal particles are sintered together. In another example, the de-binding and sintering temperatures can be in the range of from about 600° C. to about 1,500° C., or from about 800° C. to about 1,200° C. The de-binding temperature range can vary, depending on the composition of the network (e.g., aromatic dihydrazide and polymer particles). The sintering temperature range can vary, depending on the metal particle material. In one example, the sintering temperature can range from about 10° C. below the melting temperature of the metal particles of the particulate build material to about 50° C. below the melting temperature of the metal particles of the particulate build material. In another example, the sintering temperature can range from about 100° C. below the melting temperature of the metal particles of the particulate build material to about 200° C. below the melting temperature of the metal particles of the particulate build material. The sintering temperature can also depend upon the particle size and period of time that heating occurs, e.g., at a high temperature for a sufficient time to cause particle surfaces to become physically merged or composited together. For example, a sintering temperature for stainless steel can be about 1,400° C. and an example of a sintering temperature for aluminum or aluminum alloys can range from about 550° C. to about 620° C. Temperatures outside of these ranges can be used as determined on a case by case basis.

During heating in the oven, the heating device can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof. Upon removal of the sintered 3D object from the oven and cooling (or annealing by controlling the cool down rate in the oven), the sintering 3D object can be treated or polished, such as by sand blasting, bead blasting, air jetting, tumble finishing such as barrel finishing, vibratory finishing, or a combination thereof. Tumble or vibratory finishing techniques can be performed wet (involving liquid lubricants, cleaners, or abrasives) or dry.

In any of the methods disclosed herein, different shaped objects may be printed in different orientations within the printing system. As such, while the object may be printed from the bottom of the object to the top of the object, it may alternatively be printed starting with the top of the object to the bottom of the object, or from a side of the object to another side of the object, or at any other orientation that is suitable or desired for the particular geometry of the part being formed.

To further illustrate the present disclosure, an example is given herein. It is to be understood that this example is provided for illustrative purposes and is not to be construed as limiting the scope of the present disclosure.

EXAMPLE

To evaluate the tensile strength of a binder fluid with an aromatic dihydrazide adhesion promoter (Example), of a comparative binder fluid with a non-aromatic alkyl dihydrazide (Comp. Ex. 1), and a second comparative binder fluid without any dihydrazide adhesion promoter (Comp. Ex. 2, as a control), the following binder fluid formulations were prepared, according to Table 3:

TABLE 3

| Binder Fluid Components | % Active | Example Binder | Comp. Ex. 1 Binder | Comp. Ex. 2 Binder (Control) |
| --- | --- | --- | --- | --- |
| 1,2-butanediol | As is | 26 | 26 | 26 |
| Tergitol ® 15-S-7 | 100 | 0.9 | 0.9 | 0.9 |
| Tergitol ® TMN-6 | 90 | 0.9 | 0.9 | 0.9 |
| Cyan Dye* | 12.72 | 0.4 | 0.4 | 0.4 |
| Methyl Methacrylate, Styrene, Butyl Acrylate, and Methacrylic Acid Copolymer Polymer Particles (wt ratio 80/10/7/3) (Tg ~90; D50 of 200 nm) | 31.4 | 12 | 12 | 12 |
| Adipic Dihydrazide** | 100 | — | 0.68 | — |
| Isophthalic Dihydrazide*** | 100 | 0.68 | — | — |
| Water | | Bal. | Bal. | Bal. |

*dye is added to visually observe the binder fluid

**non-aromatic alkyl dihydrazide

***aromatic dihydrazide

Individual press bar samples were prepared. The samples included particulate build material with 100 wt % stainless steel particles having a D50 particle size of about 22 μm admixed with the various binder fluids of Table 3. To prepare the individual samples, a mixture of the stainless steel particles and the respective binder fluids were mixed in a high speed mixer to ensure homogenous mixing at a weight ratio of about 19:1 (94.8 wt % stainless steel particles; 5.2 wt % binder fluid) and then the wet particles/binder homogenous mixture was dried in a vacuum oven at a temperature ranging from about 30° C. to about 40° C. for two hours to remove most of the water content, leaving a dried homogenous mixture of binder solids and stainless steel particles.

18 g of the dried homogenous mixture was poured into the opening of a press bar mold and pressed under 2000 psi for 30 seconds to form the respective press bar samples. The dimension of the press bar samples, shown schematically at 151 in FIG. 5, was 50 mm (length) by 12 mm (width) by 5.5 mm (thickness). The individual press bar samples were then carefully separated from the mold and heated in a vacuum oven. The heating conditions included two stages. For some samples (labeled—A), the first stage included heating at 180° C. for about 10 minutes without vacuum; and the second stage included heating at 180° C. at 22-25 in Hg for 30 minutes with a slow stream of air to provide for removal of solvents and some or even full curing of the polymer particle binder. For other samples (labeled—B), the first stage included heating at 160° C. for about 10 minutes without vacuum; and the second stage included heating at 160° C. at 22-25 in Hg for 30 minutes with a slow stream of air to provide for removal of solvents and some or even full curing of the polymer particle binder. For still other samples (labeled—C), the first stage included heating at 140° C. for about 10 minutes without vacuum; and the second stage included heating at 140° C. at 22-25 in Hg for 30 minutes with a slow stream of air to provide for removal of solvents and some or even full curing of the polymer particle binder. Table 4 shows the various sample identifiers, the binder fluid with which the sample was prepared, and the corresponding heating temperatures.

TABLE 4

| Curing Temp | Samples prepared with Example Binder | Comp. Samples prepared with Comp. Ex. 1 Binder | Comp. Samples prepared with Comp. Ex. 2 Binder (Control) |
| --- | --- | --- | --- |
| 180° C. | PB-A | CPB-1-A | CPB-2-A |
| 160° C. | PB-B | CPB-1-B | CPB-2-B |
| 140° C. | PB-C | CPB-1-C | CPB-2-C |

Figure 5:
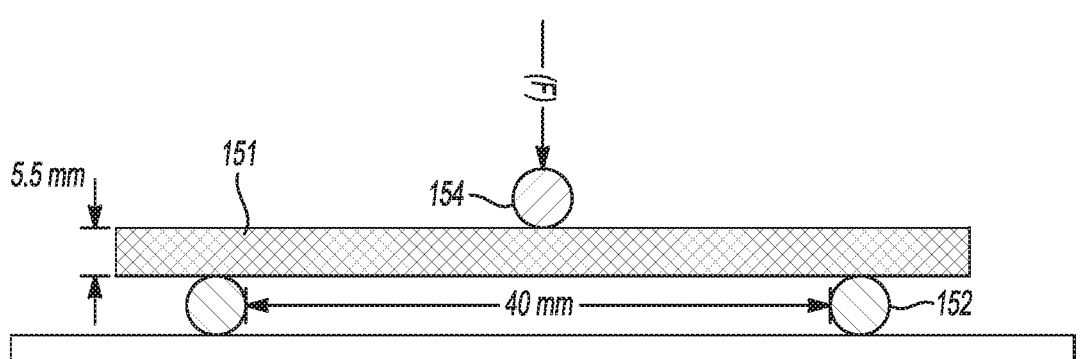
FIG. 5 illustrates an example tensile strength apparatus that can be used to evaluate tensile strength provided by various compositions for use in 3D printing kits in accordance with the present disclosure.

A tensile strength test was conducted as shown in FIG. 5. The individual cured press bar samples were then cooled and submitted to a 3-point bend INSTRON® tester, as shown by example in FIG. 5, to measure their tensile strength. The INSTRON® tester, available from Instron (USA), included a support 150, supporting pins 152, and a loading pin 154 which applied increasing force (F) to the individual press bar samples until they failed (broke under force). For the various individual press bar samples, at least five press bars were made and the average maximum tensile stress (mPa) and standard deviation were reported. The average data of this study is provided in Table 5. The average data and standard deviation data for the samples cured at 180° C. are shown in FIG. 6, the average data and standard deviation data for the samples cured at 160° C. are shown in FIG. 7, and the average data and standard deviation data for the samples cured at 140° C. are shown in FIG. 8.

TABLE 5

| Press Bar Sample ID | Curing Temp | Average Maximum Tensile Stress (mPa) | Standard Deviation |
| --- | --- | --- | --- |
| PB-A | 180° C. | 9.89 | 0.25 |
| CPB-1-A | 180° C. | 4.59 | 0.16 |
| CPB-2-A | 180° C. | 3.30 | 0.15 |
| PB-B | 160° C. | 9.93 | 0.28 |
| CPB-1-B | 160° C. | 5.57 | 0.18 |
| CPB-2-B | 160° C. | 2.94 | 0.1 |
| PB-C | 140° C. | 9.27 | 0.35 |
| CPB-1-C | 140° C. | 4.93 | 0.2 |
| CPB-2-C | 140° C. | 2.91 | 0.12 |

Figure 6:
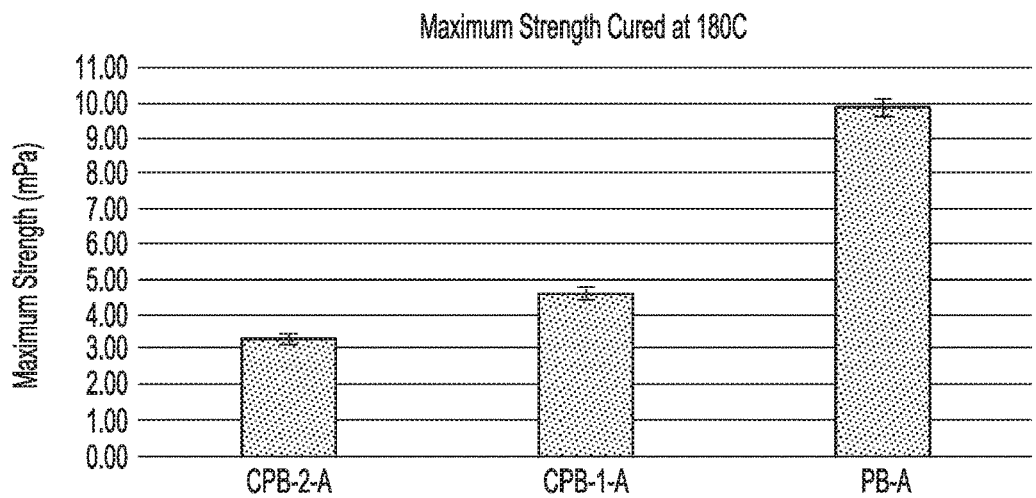
FIG. 6 is a graph showing the maximum stress to break for press bars made using examples of a binder fluid composition disclosed herein, and comparative press bars made using a comparative binder fluid composition, where heating was performed at 180° C.
Figure 7:
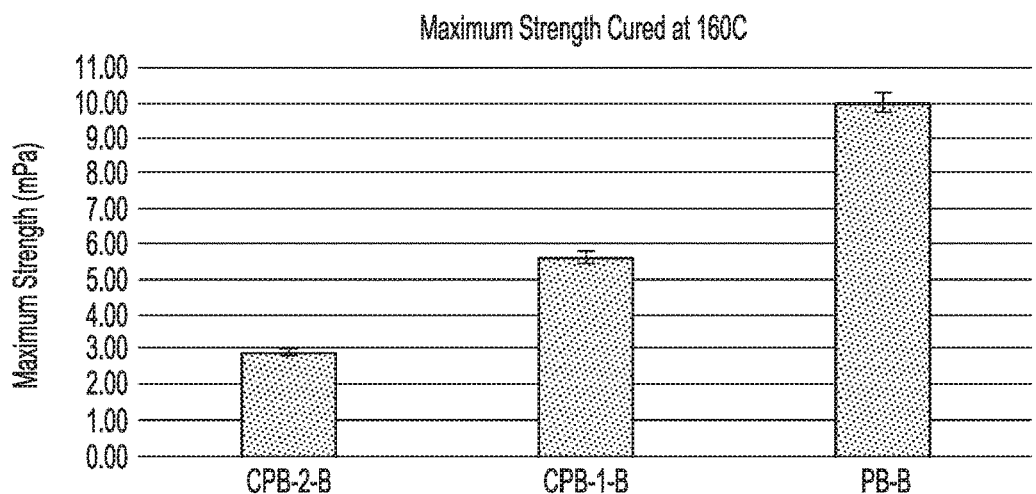
FIG. 7 is a graph showing the maximum stress to break for press bars made using different examples of the binder fluid composition disclosed herein, and a comparative press bar made using a comparative binder fluid composition, where heating was performed at 160° C.
Figure 8:
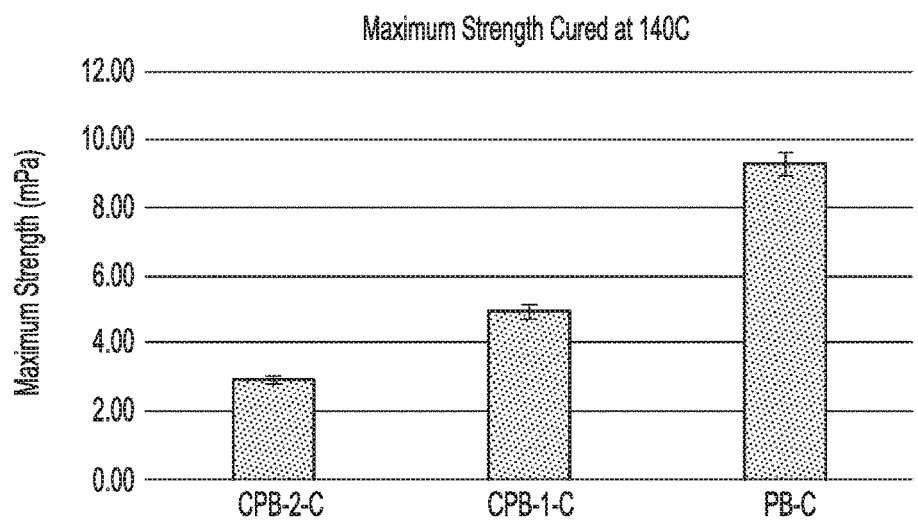
FIG. 8 is a graph showing the maximum stress to break for press bars made using different examples of the binder fluid composition disclosed herein, and a comparative press bar made using a comparative binder fluid composition, where heating was performed at 140° C.

As can be seen from Table 5 and FIGS. 6 through 8, a small quantity of the aromatic dihydrazide adhesion promoter can be effective in improving the tensile stress of a press bar (and a 3D intermediate part), even at relatively low curing temperatures. Moreover, the strength of the press bars formed with the aromatic dihydrazide as the adhesion promoter was about 3-4 times better than the control (at any curing temperature, e.g., compare PB-A with CPB-2-A, PB-B with CPB-2-B, and PB-C with CPB-2-C), and was about 2 times better than the alkyl dihydrazide (at any curing temperature, e.g., compare PB-A with CPB-1-A, PB-B with CPB-1-B, and PB-C with CPB-1-C).

It was also noted that the amount of polymer particles (e.g., 12 wt %) was at the lower end of the range disclosed herein. Even with this relatively low amount, the aromatic dihydrazide exhibited improved strength.

It is to be understood that the ranges provided herein include the stated range and any value or sub-range within the stated range, as if such values or sub-ranges were explicitly recited. For example, from about 500° C. to about 3,500° C. should be interpreted to include not only the explicitly recited limits of from about 500° C. to about 3,500° C., but also to include individual values, such as about 690° C., 1,000.5° C., 2,055° C., 2,750° C., etc., and sub-ranges, such as from about 900° C. to about 3,250° C., from about 525° C. to about 2,500° C., from about 1,020° C. to about 2,020° C., etc. Furthermore, the term "about" as used herein in reference to a numerical value or range, allows for a degree of variability in the value or range, for example, within 10%, or, in one aspect within 5%, of a stated value or of a stated limit of a range.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is noted that, as used in this specification and the appended claims, the singular forms "a," "an," and "the" include plural referents unless the content clearly dictates otherwise.

While several examples have been described in detail, it is to be understood that the disclosed examples may be modified. Therefore, the foregoing description is to be considered non-limiting.

What is claimed is:

1. A three-dimensional printing kit, comprising:
   a particulate build material including from about 80 wt % to 100 wt % metal particles based on a total weight of the particulate build material; and
   a binder fluid including water, polymer particles in an amount ranging from about 1 wt % to about 40 wt % based on a total weight of the binder fluid, and an aromatic dihydrazide adhesion promoter in an amount ranging from about 0.05 wt % to about 5 wt % based on the total weight of the binder fluid;
   wherein the polymer particles are dispersed in the binder fluid, and have an average particle size ranging from about 1 nm to about 400 nm.

2. The three-dimensional printing kit as defined in claim 1 wherein the aromatic dihydrazide adhesion promoter has a general formula:

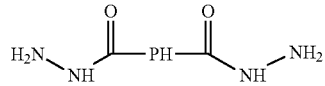

wherein PH is selected from an unsubstituted phenyl group and a substituted phenyl group.

3. The three-dimensional printing kit as defined in claim 2 wherein PH is the unsubstituted phenyl group and the aromatic dihydrazide adhesion promoter is selected from the group consisting of isophthalic dihydrazide; phthalic dihydrazide; and terephthalic dihydrazide.

4. The three-dimensional printing kit as defined in claim 2 wherein PH is the substituted phenyl group and the aromatic dihydrazide adhesion promoter is selected from the group consisting of 3-choloro-isophthalic dihydrazide; 3-choloro-phthalic dihydrazide; 2-choloro-terephtahlic dihydrazide; 3-bromo-isophtahlic dihydrazide; 3-bromo-phthalic dihydrazide; 2-bromo-terephtahlic dihydrazide; 3-hydroxy-isophtahlic dihydrazide; 3-(2-hydroxyethyl)-isophthalic dihydrazide; 3-sulfo-isophtahlic dihydrazide; 3-nitro-isophtahlic dihydrazide; 3-nitro-phthalic dihydrazide; 2-nitro-terephtahlic dihydrazide; 3-amino-isophthalic dihydrazide; 2-amino-terephthalic dihydrazide; and 3-amino-phthalic dihydrazide.

5. The three-dimensional printing kit as defined in claim 1 wherein the polymer particles have a glass transition temperature higher than 60° C.

6. The three-dimensional printing kit as defined in claim 1 wherein the metal particles are selected from the group consisting of aluminum, aluminum alloys, titanium, titanium alloys, copper, copper alloys, cobalt, cobalt alloys, chromium, chromium alloys, nickel, nickel alloys, vanadium, vanadium alloys, tin, tin alloys, tungsten, tungsten alloys, tungsten carbide, tantalum, tantalum alloys, molybdenum, molybdenum alloys, magnesium, magnesium alloys, gold, gold alloys, silver, silver alloys, zirconium, zirconium alloys, ferrous alloys, stainless steel, steel, and an admixture thereof.

7. The three-dimensional printing kit as defined in claim 1 wherein the particulate build material is devoid of a polymer resin.

\* \* \* \* \*